United States Patent
Perrelli et al.

(10) Patent No.: US 11,851,163 B2
(45) Date of Patent: Dec. 26, 2023

(54) HYDRAULICALLY LOCKING ACTUATOR CONFIGURATION

(71) Applicant: Hamilton Sundstrand Corporation, Charlotte, NC (US)

(72) Inventors: Frank Perrelli, East Haven, CT (US); Morgan O'Rorke, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/728,002

(22) Filed: Apr. 25, 2022

(65) Prior Publication Data

US 2023/0339603 A1    Oct. 26, 2023

(51) Int. Cl.
*F15B 13/044*    (2006.01)
*B64C 19/00*    (2006.01)
*F15B 15/26*    (2006.01)

(52) U.S. Cl.
CPC ............ *B64C 19/00* (2013.01); *F15B 13/044* (2013.01); *F15B 15/26* (2013.01)

(58) Field of Classification Search
CPC ......... F15B 13/04; F15B 13/044; F15B 15/26
See application file for complete search history.

(56) References Cited

U.S. PATENT DOCUMENTS

| 4,343,454 A | 8/1982 | Kure-Jensen et al. |
| 4,375,780 A | 3/1983 | Davis |
| 5,197,516 A | 3/1993 | Smietana |
| 5,950,427 A | 9/1999 | Demerjian, Jr. et al. |
| 7,836,676 B2 | 11/2010 | Futa, Jr. et al. |
| 8,201,856 B2 | 6/2012 | Etling |
| 8,831,848 B2 | 9/2014 | Lang et al. |
| 10,718,293 B2 | 7/2020 | Davies |

(Continued)

FOREIGN PATENT DOCUMENTS

| CN | 102464200 A | * | 5/2012 | |
| DE | 102019107976 B3 | * | 7/2020 | ............... B63G 8/14 |

(Continued)

OTHER PUBLICATIONS

European Search Report for European Application No. 23169768.1; dated Sep. 25, 2023; 6 pages.

*Primary Examiner* — Kenneth Bomberg
*Assistant Examiner* — Daniel S Collins
(74) *Attorney, Agent, or Firm* — CANTOR COLBURN LLP

(57) ABSTRACT

Hydraulic actuator systems of aircraft are described. The hydraulic actuator systems include a hydraulic actuator having a housing and piston therein. The piston includes a piston head separating the housing into a retract cavity and an extend cavity. An actuator controller is hydraulically coupled to the retract cavity by a first hydraulic line and hydraulically coupled to the extend cavity by a second hydraulic line and configured to control a hydraulic pressure within each of the retract cavity and the extend cavity to control actuation of the hydraulic actuator. A position-lock controller is arranged along at least one of the first hydraulic line and the second hydraulic line, the position-lock controller is configured to hydraulically decouple the actuator controller from at least one of the retract cavity and the extend cavity.

17 Claims, 4 Drawing Sheets

(56) References Cited

U.S. PATENT DOCUMENTS

| | | |
|---|---|---|
| 10,788,127 B2 | 9/2020 | De Landtsheere |
| 11,137,000 B2 | 10/2021 | Chester |
| 2004/0245386 A1 | 12/2004 | Huynh |
| 2018/0320715 A1* | 11/2018 | Haugsjaahabink ....... F15B 9/10 |
| 2019/0203743 A1 | 7/2019 | Serricchio et al. |
| 2020/0255126 A1 | 8/2020 | Medina |

FOREIGN PATENT DOCUMENTS

| | | | | |
|---|---|---|---|---|
| EP | 0864491 A1 * | 9/1998 | ............. | B64C 13/05 |
| EP | 3514056 A1 | 7/2019 | | |

* cited by examiner

HYDRAULICALLY LOCKING ACTUATOR CONFIGURATION

BACKGROUND

The following description relates to hydraulic actuators and, more particularly, to hydraulic actuator systems that employ hydraulic locking to secure the actuator in a last scheduled position.

In many engine actuator applications, an actuator is sent into or positioned in a fail-safe position in an event of an electrical failure. This fail-safe position may be an extended or retracted position. In helicopters, however, the notion of automatically positioning an actuator in a fail-safe position instead of a last-commanded position in the event of an electrical failure might not be desirable because of a need to maintain certain flight control parameters. Indeed, in at least some cases, while it is actually desirable to hold the actuator in the last commanded position instead of the fail-safe position in the event of an electrical failure, the nature of control systems of typical hydraulically powered actuators of helicopters makes doing so difficult. Accordingly, improved actuator systems are desirable.

BRIEF DESCRIPTION

According to some aspects of the present disclosure, hydraulic actuator systems for aircraft are provided. The hydraulic actuator systems include a hydraulic actuator having a housing with a piston arranged within the housing, the piston having a piston head separating the housing into a retract cavity and an extend cavity, an actuator controller hydraulically coupled to the retract cavity by a first hydraulic line and hydraulically coupled to the extend cavity by a second hydraulic line, wherein the actuator controller is configured to control a hydraulic pressure within each of the retract cavity and the extend cavity to control actuation of the hydraulic actuator, and a position-lock controller arranged along at least one of the first hydraulic line and the second hydraulic line, the position-lock controller configured to hydraulically decouple the actuator controller from at least one of the retract cavity and the extend cavity.

In addition to one or more of the features described herein, or as an alternative, further embodiments of the hydraulic actuator systems may include that the hydraulic decoupling occurs in response to a failure of the hydraulic actuator system.

In addition to one or more of the features described herein, or as an alternative, further embodiments of the hydraulic actuator systems may include that the failure is a power failure to the hydraulic actuator system.

In addition to one or more of the features described herein, or as an alternative, further embodiments of the hydraulic actuator systems may include that the position-lock controller is configured to maintain the at least one hydraulic line in an open state until the failure occurs.

In addition to one or more of the features described herein, or as an alternative, further embodiments of the hydraulic actuator systems may include that the position-lock controller is coupled along both the first hydraulic line and the second hydraulic line.

In addition to one or more of the features described herein, or as an alternative, further embodiments of the hydraulic actuator systems may include that the position-lock controller is a first position-lock controller arranged along the first hydraulic line, the system further comprising a second position-lock controller arranged along the second hydraulic line.

In addition to one or more of the features described herein, or as an alternative, further embodiments of the hydraulic actuator systems may include that the position-lock controller comprises a solenoid.

In addition to one or more of the features described herein, or as an alternative, further embodiments of the hydraulic actuator systems may include that the actuator controller is an electrohydraulic servo valve.

In addition to one or more of the features described herein, or as an alternative, further embodiments of the hydraulic actuator systems may include an aircraft system, wherein the piston is configured to actuate a component of the aircraft system.

According to some embodiments, methods of operating hydraulic actuator systems onboard aircraft are provided. The methods include controlling hydraulic pressure to a retract cavity from an actuator controller through a first hydraulic line that hydraulically couples the actuator controller to the retract cavity, controlling hydraulic pressure to an extend cavity from the actuator controller through a second hydraulic line that hydraulically couples the actuator controller to the extend cavity, and operating a position-lock controller to hydraulically lock at least one of the retract cavity and the extend cavity, wherein the position-lock controller is arranged along at least one of the first hydraulic line and the second hydraulic line.

In addition to one or more of the features described herein, or as an alternative, further embodiments of the methods may include that the position-lock controller is operated in response to a failure of the hydraulic actuator system.

In addition to one or more of the features described herein, or as an alternative, further embodiments of the methods may include that the failure is a power failure to the hydraulic actuator system.

In addition to one or more of the features described herein, or as an alternative, further embodiments of the methods may include maintaining the at least one hydraulic line in an open state using the position-lock controller until the failure occurs.

In addition to one or more of the features described herein, or as an alternative, further embodiments of the methods may include that the position-lock controller is coupled along both the first hydraulic line and the second hydraulic line, wherein the position-lock controller is configured to hydraulically lock both the retract cavity and the extend cavity.

In addition to one or more of the features described herein, or as an alternative, further embodiments of the methods may include that the position-lock controller is a first position-lock controller arranged along the first hydraulic line and configured to hydraulically lock the retract cavity, the method further comprising operating a second position-lock controller arranged along the second hydraulic line and configured to hydraulically lock the extend cavity.

In addition to one or more of the features described herein, or as an alternative, further embodiments of the methods may include that the position-lock controller comprises a solenoid.

In addition to one or more of the features described herein, or as an alternative, further embodiments of the methods may include that the actuator controller is an electrohydraulic servo valve.

In addition to one or more of the features described herein, or as an alternative, further embodiments of the methods may include that the position-lock controller is configured to hydraulically lock one of the retract cavity and the extend cavity by decoupling the respective hydraulic line, the method further comprising passing a hydraulic fluid through the other of the extend cavity and the retract cavity that is not hydraulically locked.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, a system and method are provided to allow for tight control of a position in a hydraulically controlled actuator system. Such actuator systems may be, for example and without limitation, fail-fixed hydraulic actuator systems or position-fixed hydraulic actuator systems. Hydraulic actuation systems are useful for high load and slew rate capabilities, but such actuators may tend to revert to an extend or retract stop point at a time of failure, even if the piston of the actuator is not at an end position. That is, in a failure condition, conventional actuators may be biased to one end-stop (e.g., fully retracted or fully extended). However, it may be desirable to have an actuator that remains in a last commanded position despite a failure. That is, it may be beneficial to have an actuator that remains in a current position rather than fully extending or fully retracting at a time of failure. Such failures may be the result of power loss, control loop failure, or the like. Additionally, last-commanded-position operation of an actuator system be beneficial outside of failure conditions, such as low pressure conditions which can benefit from allowing for reduced pressure out from a pumping system while maintaining sufficient force at the actuator.

Actuator systems may be controlled by a servo valve and the actuator is slewed back and forth by a switching of a flow path in the servo valve. This is done by varying current to a torque motor that in one of many ways diverts flow and high pressure to either the extend or retract chamber of the actuator. In the event where the electrical control to the servo valve is lost or failed in one direction it can be beneficial to prevent the actuator from leaving its last scheduled position. By hydraulically locking one or both sides of the actuator chambers this can be efficiently accomplished and used to maintain position of the actuator even under great loads.

Figure 1A:
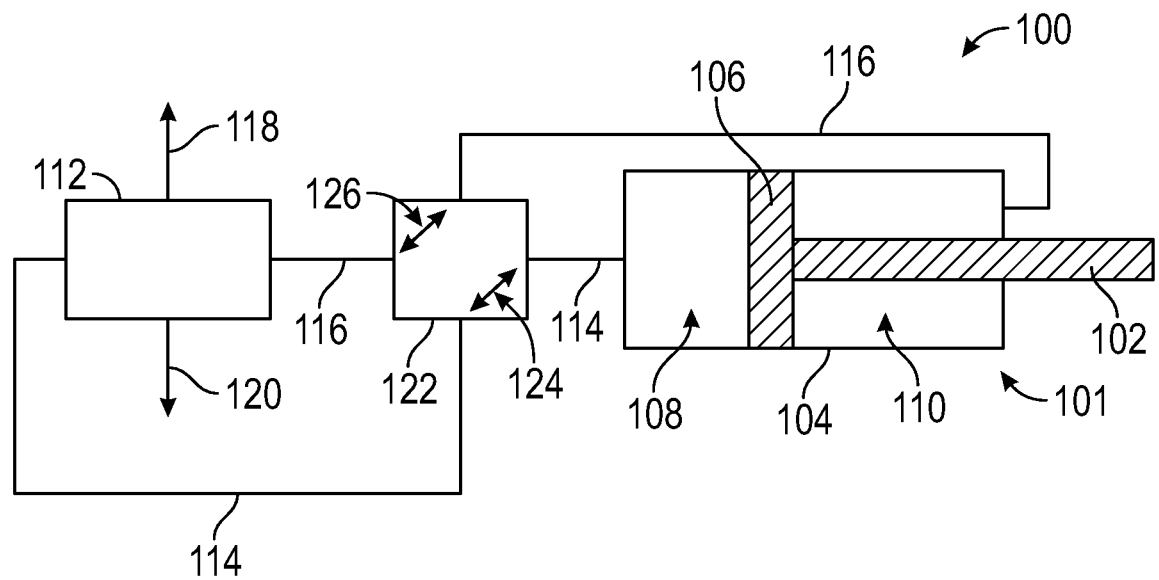
FIG. 1A is a schematic illustration of an actuator system in accordance with an embodiment of the present disclosure, showing an open state.
Figure 1B:
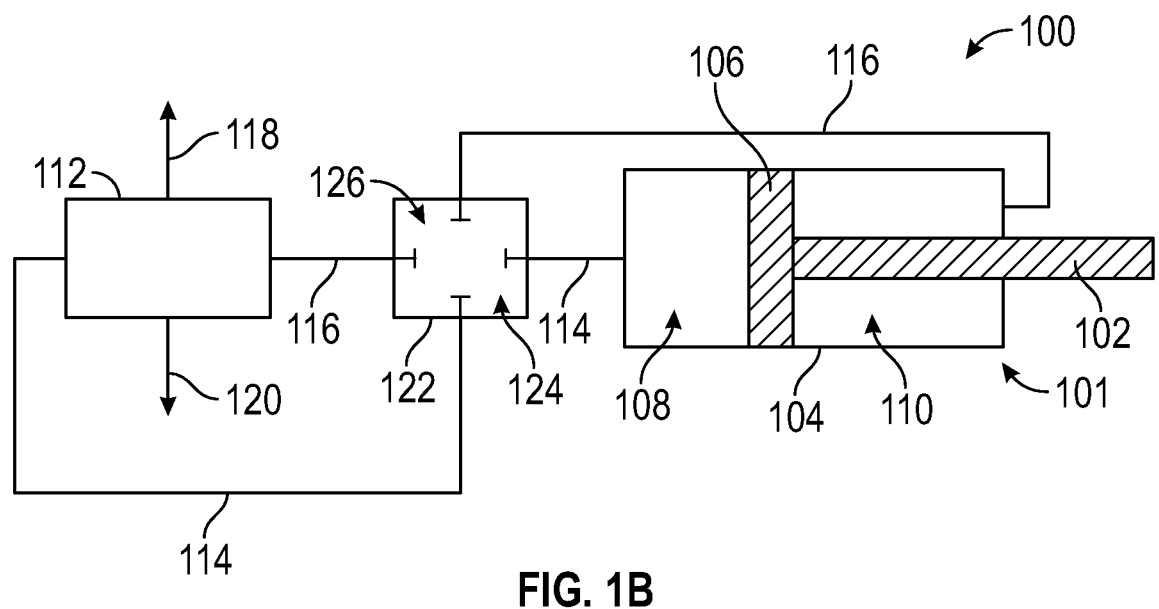
FIG. 1B is a schematic illustration of the actuator system of FIG. 1A, showing a closed state with an actuator controller decoupled from cavities of a piston actuator.

Referring to FIGS. 1A-1B, schematic illustrations of an actuator system 100 in accordance with an embodiment of the present disclosure are shown. The actuator system 100 may be used onboard aircraft to perform an actuating operation of an actuator 101 through actuation or movement of a piston 102 within a housing 104. The piston 102 includes a piston head 106 that is configured to have hydraulic pressure applied thereto such that the piston head 106 translates or otherwise moves within the housing 104. The housing 104 defines a retract cavity 108 and an extend cavity 110 which are defined on opposite sides of the piston head 106. The actuator 101 may be coupled to a component and/or system of an aircraft to perform actuation or operation of such component or system. Such components or systems can include, without limitation, valves, blades, flight structures (e.g., flaps, slats, etc.), and the like, as will be appreciated by those of skill in the art.

To cause movement of the piston 102 relative to the housing 104, the retract cavity 108 and the extend cavity are each hydraulically (and/or fluidly) coupled to an actuator controller 112 which can be controlled to increase or decrease a pressure within the cavities 108, 110. The actuator controller 112 may be an electrohydraulic servo valve or the like, as will be appreciated by those of skill in the art. For example, the retract cavity 108 may be coupled (hydraulically and/or fluidly) to the actuator controller 112 by a first hydraulic line 114. Similarly, the extend cavity 110 may be coupled (hydraulically and/or fluidly) to the actuator controller 112 by a second hydraulic line 116.

In a normal state of operation, hydraulic pressure is directed from the actuator controller 112 to fill the retract cavity 108 and the extend cavity 110. The pressure levels of the two cavities 108, 110 may be adjusted or controlled to control operation and actuation of the piston 102. For example, a low pressure within the retract cavity 108 and high pressure in the extend cavity 110 will cause the piston 102 to retract into the housing 104. Similarly, when the pressure within the extend cavity 110 is lower than the pressure within the retract cavity 108, the piston 102 will be extended outward from the housing 104. The pressures within the cavities 108, 110 are controlled by the supply from the actuator controller 112 through the hydraulic lines 114, 116. The actuator controller 112 is configured with a supply pressure 118 (e.g., high pressure) and a drain pressure 120 (e.g., low pressure). By regulating and controlling the hydraulic pressure through the hydraulic lines 114, 116, the actuator controller 112 controls operation of the actuator system 100.

Arranged along each of the hydraulic lines 114, 116 is a position-lock controller 122. The position-lock controller 122 may include one or more solenoids that are configured to selectively connect and disconnect each of the hydraulic lines 114, 116. For example, the position-lock controller 122 can include a first selective coupler 124 arranged along the first hydraulic line 114 and a second selective coupler 126 arranged along the second hydraulic line 116. FIG. 1A illustrates both the first and second selective couplers 124, 126 in an open position, allowing for hydraulic coupling between the actuator controller 112 and the cavities 108, 110 along the hydraulic lines 114, 116. FIG. 1B illustrates both the first and second selective couplers 124, 126 in a closed position, preventing hydraulic coupling between the actuator controller 112 and the cavities 108, 110 along the hydraulic lines 114, 116. That is, the position-lock controller 122 is configured to selectively lock pressures within the cavities 108, 110 to secure the position of the piston 102 and preventing changes in the relatively pressure across the piston head 106. The decoupling (FIG. 1B) may be initiated or activated in the event of a power failure (or other failure) of the actuator system 100. As such, when power is lost, the actuator system 100 may be fixed in a last commanded position and the piston 102 will not transition to a fully retracted or fully extended position upon such failure.

In operation, the actuator controller 112 is configured to increase or decrease a hydraulic pressure in the cavities 108, 110. This change in hydraulic pressure causes the piston 102 to translate within the housing 104 (i.e., actuate). When a failure occurs or in response to a command, the hydraulic lines 114, 116 are decoupled from the respective cavities 108, 110, thus maintaining the pressure within the cavities 108, 110 at the existing pressure levels at the time of the failure. Accordingly, the piston 102 will be locked into place at the time of the failure.

In this configuration, the position-lock controller 122 may be a switching solenoid that placed between the controlling actuator controller 112 and the actuator that can deadhead flow into and out of the actuator 101. If the actuator controller 112 fails or runs away in either direction the solenoid may be configured to hydraulically lock both sides of the actuator 101. In some embodiments, rather than locking both sides of the actuator 101 (e.g., decoupling hydraulic coupling to both cavities 108, 110), the position-lock controller 122 may be configured to lock one side of the actuator 101. Such single-sided locking of the actuator 101 may be helpful in a situation where cooling flow is dependent on flow through one of the cavities 108, 110 of the actuator 101.

Figure 2:
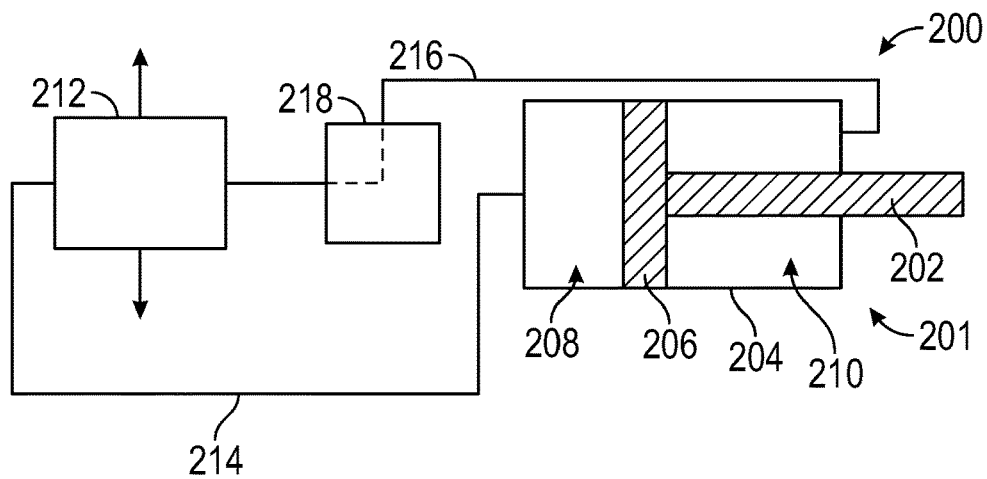
FIG. 2 is a schematic illustration of an actuator system in accordance with an embodiment of the present disclosure.

Referring to FIG. 2, a schematic illustration of an actuator system 200 in accordance with an embodiment of the present disclosure are shown. The actuator system 200 is substantially similar to that shown and described above and includes an actuator 201 having a piston 202 within a housing 204. The piston 202 includes a piston head 206 that is configured to have hydraulic pressure applied thereto from a retract cavity 208 and an extend cavity 210. In this embodiment, an actuator controller 212 is hydraulically coupled to the retract cavity 208 by a first hydraulic line 214 and to the extend cavity 210 by a second hydraulic line 216. In contrast to the embodiment of FIGS. 1A-1B, the first hydraulic line 214 is always connected and only the second hydraulic line 216 includes a position-lock controller 218 arranged along the second hydraulic line 216. In this configuration, the hydraulic pressure within the extend cavity 210 can be locked, while maintaining the hydraulic connection to the retract cavity 208. The hydraulic locking of the extend cavity 210 may be performed to secure the actuator 201 in a last commanded position while also permitting flow through the retract cavity 208, such as for the purpose of passing a cooling flow therethrough or the like.

Figure 3:
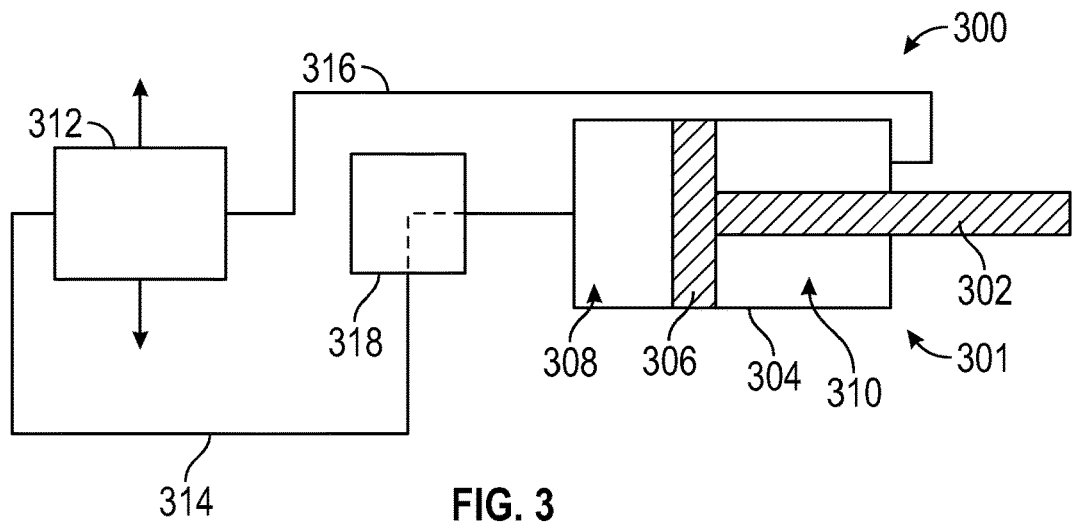
FIG. 3 is a schematic illustration of and actuator system in accordance with an embodiment of the present disclosure.

Referring to FIG. 3, a schematic illustration of an actuator system 300 in accordance with an embodiment of the present disclosure are shown. The actuator system 300 is substantially similar to that shown and described above and includes an actuator 301 having a piston 302 within a housing 304. The piston 302 includes a piston head 306 that is configured to have hydraulic pressure applied thereto from a retract cavity 308 and an extend cavity 310. In this embodiment, an actuator controller 312 is hydraulically coupled to the retract cavity 308 by a first hydraulic line 314 and to the extend cavity 310 by a second hydraulic line 316. In this embodiment, the second hydraulic line 316 is always connected and only the first hydraulic line 314 includes a position-lock controller 318 arranged along the first hydraulic line 316. In this configuration, the hydraulic pressure within the retract cavity 308 can be locked, while maintaining the hydraulic connection to the extend cavity 310. The hydraulic locking of the retract cavity 308 may be performed to secure the actuator 301 in a last commanded position while also permitting flow through the extend cavity 310, such as for the purpose of passing a cooling flow therethrough or the like.

The configuration of FIG. 2 may be configured for resisting forces that act to extend the actuator. In contrast, the configuration of FIG. 3 may be configured for resisting forces that act to retract the actuator. In the embodiment of FIG. 2, the solenoid/valve (position-lock controller 218) is only on the retract chamber line (second hydraulic line 216). Because of this, any forces acting in the retract direction may cause vaporization of the fluid and allow for movement of the piston. The opposite is true of the configuration of FIG. 3, where the solenoid/valve (position-lock controller 318) is only on the extend chamber line (first hydraulic line 314). In each case, the respective chamber is held in static pressure due to decoupling of the hydraulic lines, thus preventing a specific directional movement of the respective piston.

Figure 4:
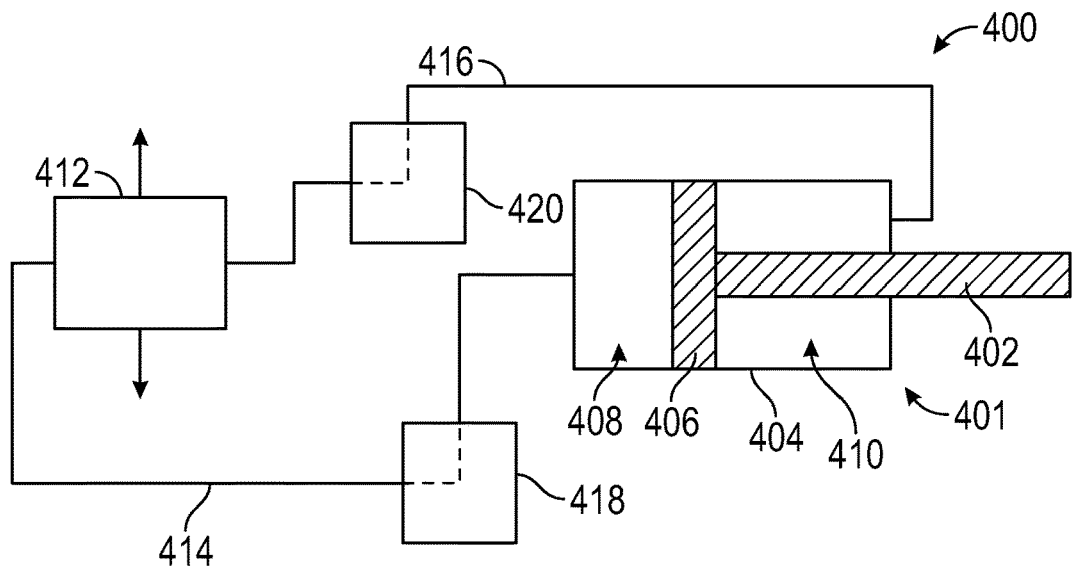
FIG. 4 is a schematic illustration of an actuator system in accordance with an embodiment of the present disclosure.

Referring to FIG. 4, a schematic illustration of an actuator system 400 in accordance with an embodiment of the present disclosure are shown. The actuator system 400 is substantially similar to that shown and described above and includes an actuator 401 having a piston 402 within a housing 404. The piston 402 includes a piston head 406 that is configured to have hydraulic pressure applied thereto from a retract cavity 408 and an extend cavity 410. In this embodiment, an actuator controller 412 is hydraulically coupled to the retract cavity 408 by a first hydraulic line 414 and to the extend cavity 410 by a second hydraulic line 416. In this embodiment, each of the first hydraulic line 414 and the second hydraulic line 416 are selectively closable. For example, as shown, a first position-lock controller 418 is arranged along the first hydraulic line 414 and a second position-lock controller 420 is arranged along the second hydraulic line 416. This configuration is similar to that shown and described above with respect to FIGS. 1A-1B, but rather than a single control valve that is coupled to both hydraulic lines, in this embodiment each hydraulic line 414, 416 includes a respective position-lock controller 418, 420.

The above described and illustrated embodiments are merely for example purposes. It will be appreciated that other various types of connections and components may be employed without departing from the scope of the present disclosure. The specific arrangement of parts and connections may be based on the specific actuator, control mechanisms, system in which the actuator is incorporated, and/or based on the component to be controlled/actuated by the actuator.

Figure 5:
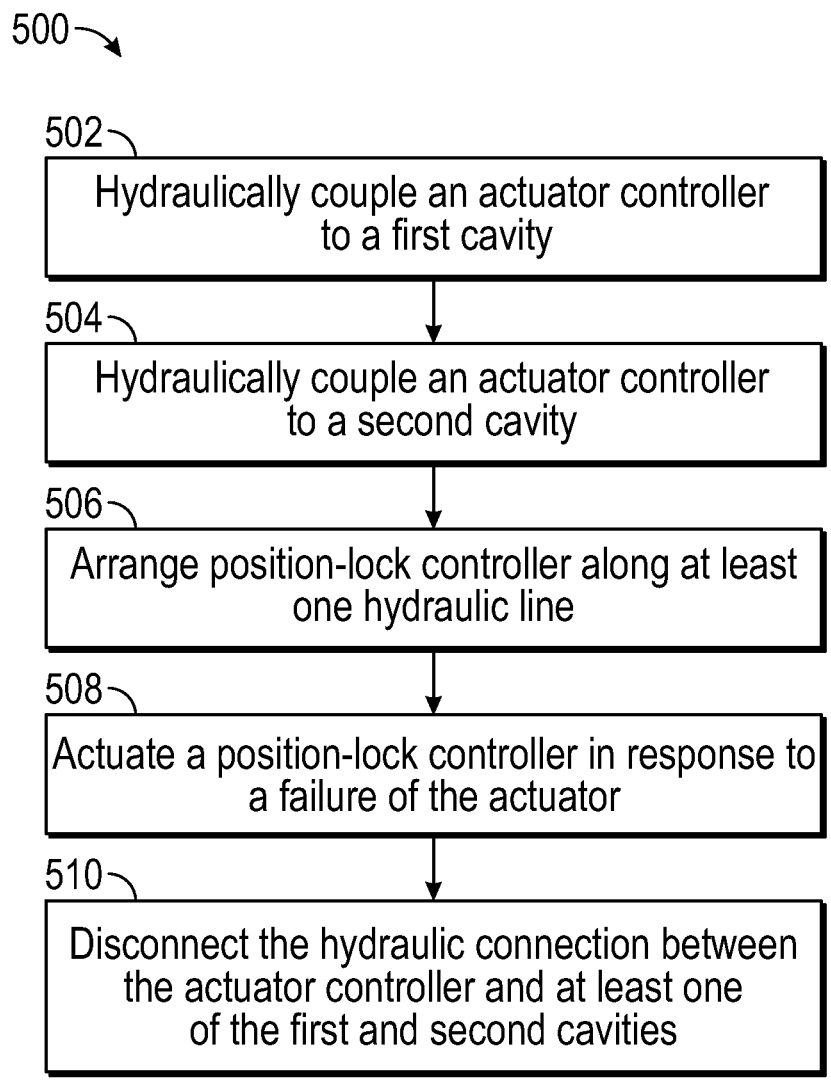
FIG. 5 is a flow process for operation of an actuator system in accordance with an embodiment of the present disclosure.

Turning now to FIG. 5, a flow process 500 for operating an actuator system in accordance with an embodiment of the present disclosure is shown. The flow process 500 is designed for operating an actuator system such as that shown and described above. The flow process 500 operation is functional with a hydraulic actuator having a piston actuator arranged within a housing with cavities defined on opposing sides of a piston head.

At block 502, an actuator controller is hydraulically coupled to a first cavity of an actuator. The first cavity may be a retract cavity of the actuator. The coupling may be through a first hydraulic line. The actuator controller is a device or system that can increase or decrease a hydraulic pressure through the hydraulic line. Such actuator controller may be an electrohydraulic servo valve or the like.

At block 504, a second hydraulic line is arranged between the actuator controller and a second cavity of the actuator. The second cavity may be an extend cavity of the actuator. The first and second cavities are defined on opposing sides of a piston head of a piston of the actuator. The actuator controller is configured to control a hydraulic pressure within the second cavity. In combination with control of hydraulic pressure within the first cavity, the actuator controller is configured to control movement of the piston head within a housing of the actuator to control actuation of the actuator.

At block 506, a position-lock controller is arranged between the actuator controller and one or both of the actuator cavities along the hydraulic lines. In some embodiments, a single position-lock controller may be arranged to couple to both the first hydraulic line and the second hydraulic line and may be configured to selectively lock the pressure within each of the cavities of the actuator (e.g., as shown in FIGS. 1A-1B). In other embodiments, a position-lock controller may be arranged on only one of the two hydraulic lines (e.g., FIGS. 2-3). In still other embodiments, each hydraulic line may include a dedicated or discrete position-lock controller (e.g., FIG. 4).

At block 508, the position-lock controller is actuated or operated in response to a failure of the actuator. The actuation of the position-lock controller may be an actuation of a solenoid in response to a lack of power. The failure may be a loss of electrical power to the position-lock controller, to the actuator, to the actuator controller, or to some other systems associated with the actuator. The actuation of the position-lock controller may be configured to disconnect or disrupt fluid and/or hydraulic connection from the actuator controller and the respective cavities of the actuator.

At block 510, the position-lock controller is positioned to disconnect hydraulic connection between the actuator controller and at least one of the two cavities. That is, when the failure occurs, the position-lock controller is transitioned from an open state (e.g., FIG. 1A) to a closed state (e.g., FIG. 1B) at the end of the actuation of block 508. As a result, the piston of the actuator will be hydraulically locked in position. This position may be the last commanded position of the actuator, rather than a fail position where the piston is moved to a fully retracted or fully extended position.

In accordance with embodiments of the present disclosure, hydraulic actuators are provided with the ability to lock an actuator in a last commanded position after a detection of a failure to a control and/or in response to a commanded fixed position state. Such position locking of the actuator can help prevent damage to the system the actuator is controlling. Advantageously, with very little added complexity any new or existing actuator can utilize the additional functionality described herein. Hydraulically locking the actuator can also be used to simplify the controlling system for the actuator. For example, in some embodiments, the actuator may be positioned at some initial stage in flight and held there without the need for continuously supplied flow or pressure. Additionally, in some embodiments, removing (stopping) a supplied pressure and flow can prevent any internal leakage or unexpected flow from a pump or the like. Advantageously, by providing the position locking described herein, the actuator can hold a position under greater loads than would be possible with given system pressures.

Figure 6:
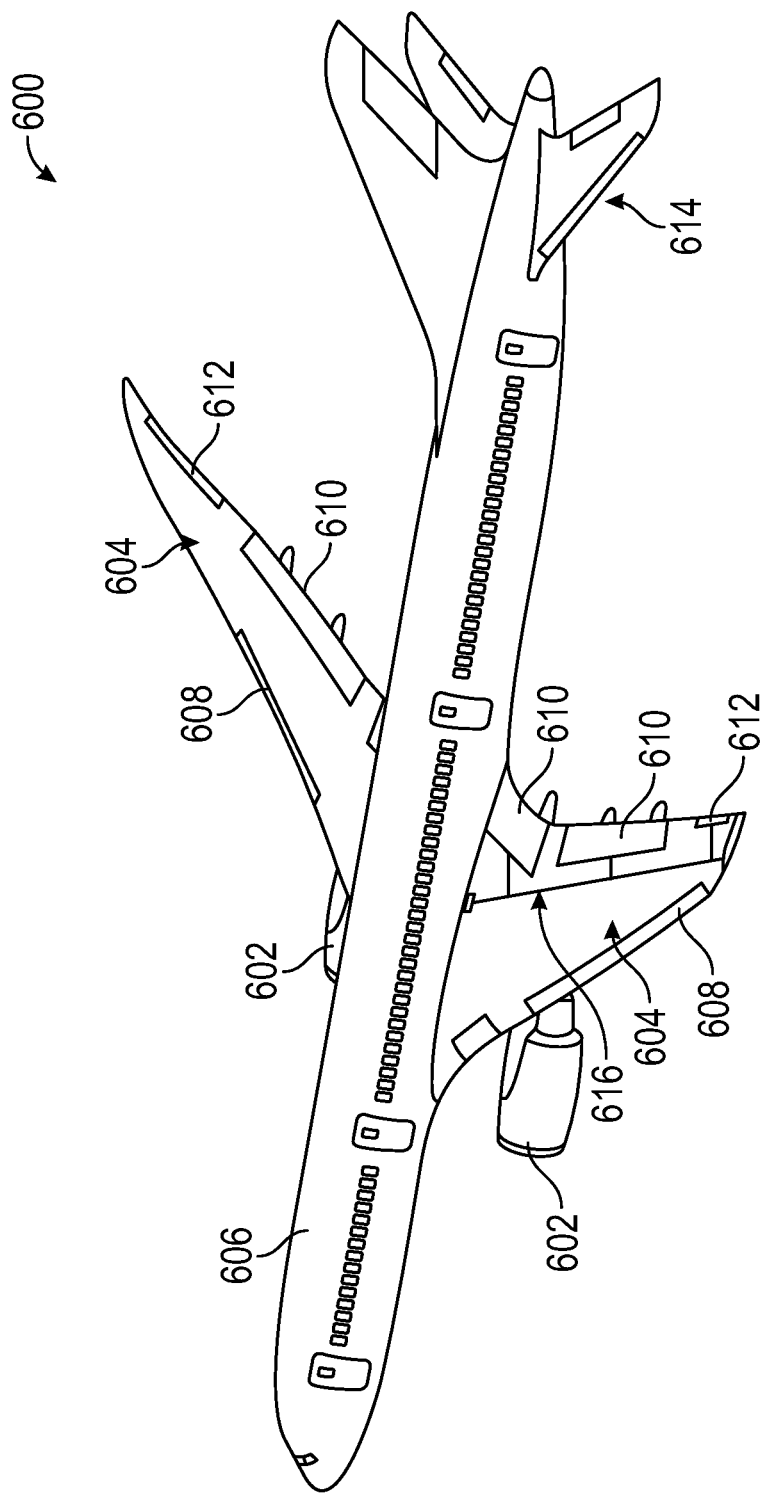
FIG. 6 is a schematic illustration of an aircraft that may incorporate embodiments of the present disclosure.

FIG. 6 illustrates an example of an aircraft 600 having aircraft engines surrounded by (or otherwise carried in) nacelles 602. The aircraft 600 includes wings 604 that extend from an aircraft fuselage 606. Each wing 604 may include one or more slats 608 on a forward edge or leading edge and one or more flaps 610 on an aft, rear, or trailing edge thereof. The wings 604 may also include ailerons 612 on the trailing edges, as will be appreciated by those of skill in the art. The aircraft 600, as shown, includes a tail structure 614 which can include various flaps, ailerons, slats, and the like, as will be appreciated by those of skill in the art. The flaps, slats, ailerons, and the like are generally referred to herein as "aerostructures" as they are movable under aircraft power systems and are configured to control flight and motion of the aircraft 600. An aerostructure actuator system 616 may be connected to one or more of the aerostructures. For example, each wing 604 and the tail structure 614 may include one or more aerostructure actuator systems 616. The aerostructure actuator systems 616 may be operably connected to the various aerostructures and configured control the operation/position of the aerostructures to control flight of the aircraft 600. In some embodiments, the aerostructure actuator systems 616 can include one or more actuator systems such as shown and described above with respect to FIGS. 1A-4. Further, the engines of the aircraft 600 may include various actuators and control mechanisms that can incorporate one or more actuator systems such as shown and described above with respect to FIGS. 1A-4. As such, the described actuator systems of the present disclosure may be incorporated into aircraft engine systems and/or aircraft flight systems. It will be appreciated that such actuator systems as described herein may be used for other purposes onboard aircraft, such as for actuating doors, landing gear, or the like.

Advantageously, embodiments of the present disclosure provide for improved actuators and fixed position operation and control for such actuators. In accordance with embodiments of the present disclosure, upon failure of the actuator and/or power thereto, one or more position-lock controllers may be actuated or operated to disconnect a hydraulic connection between an actuator controller and cavities of the actuator. When the hydraulic connection is severed, the actuator will be held in a fixed position due to static pressures in the two cavities of the actuator. This, advantageously, provides for a non-end stop point of the actuator and allows for the actuator to secure or hold position even against applied forces. As such, improved actuators are provided by embodiments of the present disclosure.

The terms "about" and "substantially" are intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A hydraulic actuator system of an aircraft, the hydraulic actuator system comprising:
    a hydraulic actuator having a housing with a piston arranged within the housing, the piston having a piston head separating the housing into a retract cavity and an extend cavity;
    an actuator controller hydraulically coupled to the retract cavity by a first hydraulic line and hydraulically coupled to the extend cavity by a second hydraulic line, wherein the actuator controller is configured to control a hydraulic pressure within each of the retract cavity and the extend cavity to control actuation of the hydraulic actuator; and
    a position-lock controller arranged along at least one of the first hydraulic line and the second hydraulic line, the position-lock controller configured to hydraulically decouple the actuator controller from at least one of the retract cavity and the extend cavity,
    wherein the hydraulic decoupling occurs in response to a failure of the hydraulic actuator system, and
    wherein the position-lock controller is configured to maintain the at least one hydraulic line in an open state until the failure occurs.

2. The hydraulic actuator system of claim 1, wherein the failure is a power failure to the hydraulic actuator system.

3. The hydraulic actuator system of claim 1, wherein the position-lock controller is coupled along both the first hydraulic line and the second hydraulic line.

4. The hydraulic actuator system of claim 1, wherein the position-lock controller is a first position-lock controller arranged along the first hydraulic line, the system further comprising a second position-lock controller arranged along the second hydraulic line.

5. The hydraulic actuator system of claim 1, wherein the position-lock controller comprises a solenoid.

6. The hydraulic actuator system of claim 1, wherein the actuator controller is an electrohydraulic servo valve.

7. The hydraulic actuator system of claim 1, further comprising an aircraft system, wherein the piston is configured to actuate a component of the aircraft system.

8. A method of operating a hydraulic actuator system onboard an aircraft, the method comprising:
    controlling hydraulic pressure to a retract cavity from an actuator controller through a first hydraulic line that hydraulically couples the actuator controller to the retract cavity;
    controlling hydraulic pressure to an extend cavity from the actuator controller through a second hydraulic line that hydraulically couples the actuator controller to the extend cavity; and
    operating a position-lock controller to hydraulically lock at least one of the retract cavity and the extend cavity, wherein the position-lock controller is arranged along at least one of the first hydraulic line and the second hydraulic line,
    wherein the position-lock controller is operated in response to a failure of the hydraulic actuator system, and
    the method includes maintaining the at least one hydraulic line in an open state using the position-lock controller until the failure occurs.

9. The method of claim 8, wherein the failure is a power failure to the hydraulic actuator system.

10. The method of claim 8, wherein the position-lock controller is coupled along both the first hydraulic line and the second hydraulic line, wherein the position-lock controller is configured to hydraulically lock both the retract cavity and the extend cavity.

11. The method of claim 8, wherein the position-lock controller is a first position-lock controller arranged along the first hydraulic line and configured to hydraulically lock the retract cavity, the method further comprising operating a second position-lock controller arranged along the second hydraulic line and configured to hydraulically lock the extend cavity.

12. The method of claim 8, wherein the position-lock controller comprises a solenoid.

13. The method of claim 8, wherein the actuator controller is an electrohydraulic servo valve.

14. The method of claim 8, wherein the position-lock controller is configured to hydraulically lock one of the retract cavity and the extend cavity by decoupling the respective hydraulic line, the method further comprising passing a hydraulic fluid through the other of the extend cavity and the retract cavity that is not hydraulically locked.

15. A hydraulic actuator system of an aircraft, the hydraulic actuator system comprising:
   a hydraulic actuator having a housing with a piston arranged within the housing, the piston having a piston head separating the housing into a retract cavity and an extend cavity;
   an actuator controller hydraulically coupled to the retract cavity by a first hydraulic line and hydraulically coupled to the extend cavity by a second hydraulic line, wherein the actuator controller is configured to control a hydraulic pressure within each of the retract cavity and the extend cavity to control actuation of the hydraulic actuator; and
   a position-lock controller arranged along at least one of the first hydraulic line and the second hydraulic line, the position-lock controller configured to hydraulically decouple the actuator controller from at least one of the retract cavity and the extend cavity,
   wherein the position-lock controller is a first position-lock controller arranged along the first hydraulic line, the system further comprising a second position-lock controller arranged along the second hydraulic line.

16. A method of operating a hydraulic actuator system onboard an aircraft, the method comprising:
   controlling hydraulic pressure to a retract cavity from an actuator controller through a first hydraulic line that hydraulically couples the actuator controller to the retract cavity;
   controlling hydraulic pressure to an extend cavity from the actuator controller through a second hydraulic line that hydraulically couples the actuator controller to the extend cavity; and
   operating a position-lock controller to hydraulically lock at least one of the retract cavity and the extend cavity, wherein the position-lock controller is arranged along at least one of the first hydraulic line and the second hydraulic line,
   wherein the position-lock controller is a first position-lock controller arranged along the first hydraulic line and configured to hydraulically lock the retract cavity, the method further comprising operating a second position-lock controller arranged along the second hydraulic line and configured to hydraulically lock the extend cavity.

17. A method of operating a hydraulic actuator system onboard an aircraft, the method comprising:
   controlling hydraulic pressure to a retract cavity from an actuator controller through a first hydraulic line that hydraulically couples the actuator controller to the retract cavity;
   controlling hydraulic pressure to an extend cavity from the actuator controller through a second hydraulic line that hydraulically couples the actuator controller to the extend cavity; and
   operating a position-lock controller to hydraulically lock at least one of the retract cavity and the extend cavity, wherein the position-lock controller is arranged along at least one of the first hydraulic line and the second hydraulic line,
   wherein the position-lock controller is configured to hydraulically lock one of the retract cavity and the extend cavity by decoupling the respective hydraulic line, the method further comprising passing a hydraulic fluid through the other of the extend cavity and the retract cavity that is not hydraulically locked.

\* \* \* \* \*